(12) United States Patent
Schlosberg et al.

(10) Patent No.: US 10,938,631 B2
(45) Date of Patent: Mar. 2, 2021

(54) QUANTITATIVE ANALYSIS OF PHYSICAL RISK DUE TO GEOSPATIAL PROXIMITY OF NETWORK INFRASTRUCTURE

(71) Applicant: Google LLC, Mountain View, CA (US)

(72) Inventors: Arran Schlosberg, Sydney (AU); Levan Hiemke, Redwood City, CA (US); Dominik Schmid, Sydney (AU)

(73) Assignee: Google LLC, Mountain View, CA (US)

( * ) Notice: Subject to any disclaimer, the term of this patent is extended or adjusted under 35 U.S.C. 154(b) by 315 days.

(21) Appl. No.: 16/039,003

(22) Filed: Jul. 18, 2018

(65) Prior Publication Data

US 2020/0028735 A1 Jan. 23, 2020

(51) Int. Cl.
*H04L 12/24* (2006.01)
*H04L 12/26* (2006.01)
*H04L 12/707* (2013.01)
*H04L 12/703* (2013.01)
*H04L 29/06* (2006.01)

(52) U.S. Cl.
CPC ...... *H04L 41/0677* (2013.01); *H04L 41/0663* (2013.01); *H04L 41/0672* (2013.01); *H04L 41/145* (2013.01); *H04L 43/06* (2013.01); *H04L 45/22* (2013.01); *H04L 45/28* (2013.01); *H04L 63/1433* (2013.01)

(58) Field of Classification Search
CPC ............. H04L 41/0677; H04L 41/0663; H04L 41/0672; H04L 41/145; H04L 43/06; H04L 45/22; H04L 45/28; H04L 63/1433; H04L 41/0816; H04L 41/0836
See application file for complete search history.

(56) References Cited

U.S. PATENT DOCUMENTS 6,678,242 B1 * 1/2004 Simon ................. H04Q 3/0025
  370/218
2002/0035460 A1 * 3/2002 Hales ..................... H04L 41/20
  703/13

(Continued)

FOREIGN PATENT DOCUMENTS

WO 2013062585 A1 5/2013

OTHER PUBLICATIONS

Cholda, Piotr, et al. "Towards risk-aware communications networking" Reliability Engineering & System Safety, vol. 109, pp. 160-174, Jan. 2013.

(Continued)

*Primary Examiner* — Hassan Kizou
*Assistant Examiner* — Abdullahi Ahmed
(74) *Attorney, Agent, or Firm* — Lerner, David, Littenberg, Krumholz & Mentlik, LLP

(57) ABSTRACT

Systems and methods of evaluating single points of failure in a computer network are provided. The system includes a processor configured to receive at least two polylines approximating respective network spans. For each point in a set of points representing geographic locations, the processor can determine a level of risk that an event at the point will affect at least the two polylines. The processor can determine an overall risk of failure by combining the level of risk for each point in the set of points. The processor can output a report indicating at least one point determined to be a potential SPoF based on the level of risk for the at least one point.

18 Claims, 9 Drawing Sheets

(56) References Cited

U.S. PATENT DOCUMENTS

| | | | | |
|---|---|---|---|---|
| 2006/0203734 | A1* | 9/2006 | Esfandiari | H04J 3/14 |
| | | | | 370/242 |
| 2012/0158445 | A1* | 6/2012 | Dufford | H04L 41/5058 |
| | | | | 705/7.11 |
| 2012/0226520 | A1* | 9/2012 | Blasius | H04L 41/145 |
| | | | | 705/7.29 |
| 2012/0323717 | A1* | 12/2012 | Kirsch | G06Q 20/0855 |
| | | | | 705/26.1 |
| 2013/0208584 | A1* | 8/2013 | Kim | H04W 72/005 |
| | | | | 370/228 |
| 2015/0242674 | A1 | 8/2015 | Ahmed et al. | |
| 2019/0207807 | A1* | 7/2019 | Mikhail | H04L 41/145 |

OTHER PUBLICATIONS

Habib, M. Farhan, et al. "Disaster survivability in optical communication networks" Computer Communications, vol. 36, No. 6, pp. 630-644, Mar. 2013.

Neumayer, Sebastian, et al. "Assessing the Vulnerability of the Fiber Infrastructure to Disasters" ACM Transactions on Networking, IEEE, vol. 19, No. 6, Dec. 2011.

Tapolcai, Janos et al: "A Tractable Stochastic Model of Correlated Link Failures Caused by Disasters", IEEE Infocom 2018 IEEE Conference on Computer Communications, IEEE, Apr. 16, 2018 (Apr. 16, 2018), pp. 2105-2113, XP033418302, DOI: 10.1109/INFOCOM.2018.8486218.

International Search Report and Written Opinion for International Application No. PCT/US2019/041975 dated Oct. 15, 2019. 16 pages.

\* cited by examiner

QUANTITATIVE ANALYSIS OF PHYSICAL RISK DUE TO GEOSPATIAL PROXIMITY OF NETWORK INFRASTRUCTURE

BACKGROUND

Computer networks largely rely on physical cabling to transmit signals between computers, be they within buildings or across continents and oceans. Such networks utilize redundancy in the form of two or more network paths between the same endpoints, but across different geographical routes. This allows for a failure in one cable (e.g., physical damage resulting in cutting of fibers or wires) without entirely compromising contivity between the endpoints. Single points of failure (SPoFs) are regions in which two or more otherwise redundant cable paths may be affected by the same outage event. For example, if two cables are within close proximity to each other and construction work damages one, it is likely that it will damage the other one too, resulting in complete compromise of the connectivity despite the intended redundancy.

SUMMARY

At least one aspect is directed to a system for evaluating single points of failure (SPoFs) in a computer network. The system includes one or more processors and a memory storing instructions configured to cause the one or more processors to receive at least a first polyline approximating a first network span and a second polyline approximating a second network span. For each point in a set of points representing geographic locations, the processor can determine a level of risk that an event at the point will affect at least the first polyline and the second polyline. The processor can determine an overall risk of failure by combining the level of risk for each point in the set of points. The processor can output a report indicating at least one point determined to be a potential SPoF based on the level of risk for the at least one point.

At least one aspect is directed to a method of evaluating single points of failure (SPoFs) in a computer network. The method executes on one or more processors. The method includes receiving at least a first polyline approximating a first network span and a second polyline approximating a second network span. For each point in a set of points representing geographic locations, determining a level of risk that an event at the point will affect at least the first polyline and the second polyline. The method includes determining an overall risk of failure by combining the level of risk for each point in the set of points. The method includes outputting a report indicating at least one point determined to be a potential SPoF based on the level of risk for the at least one point.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
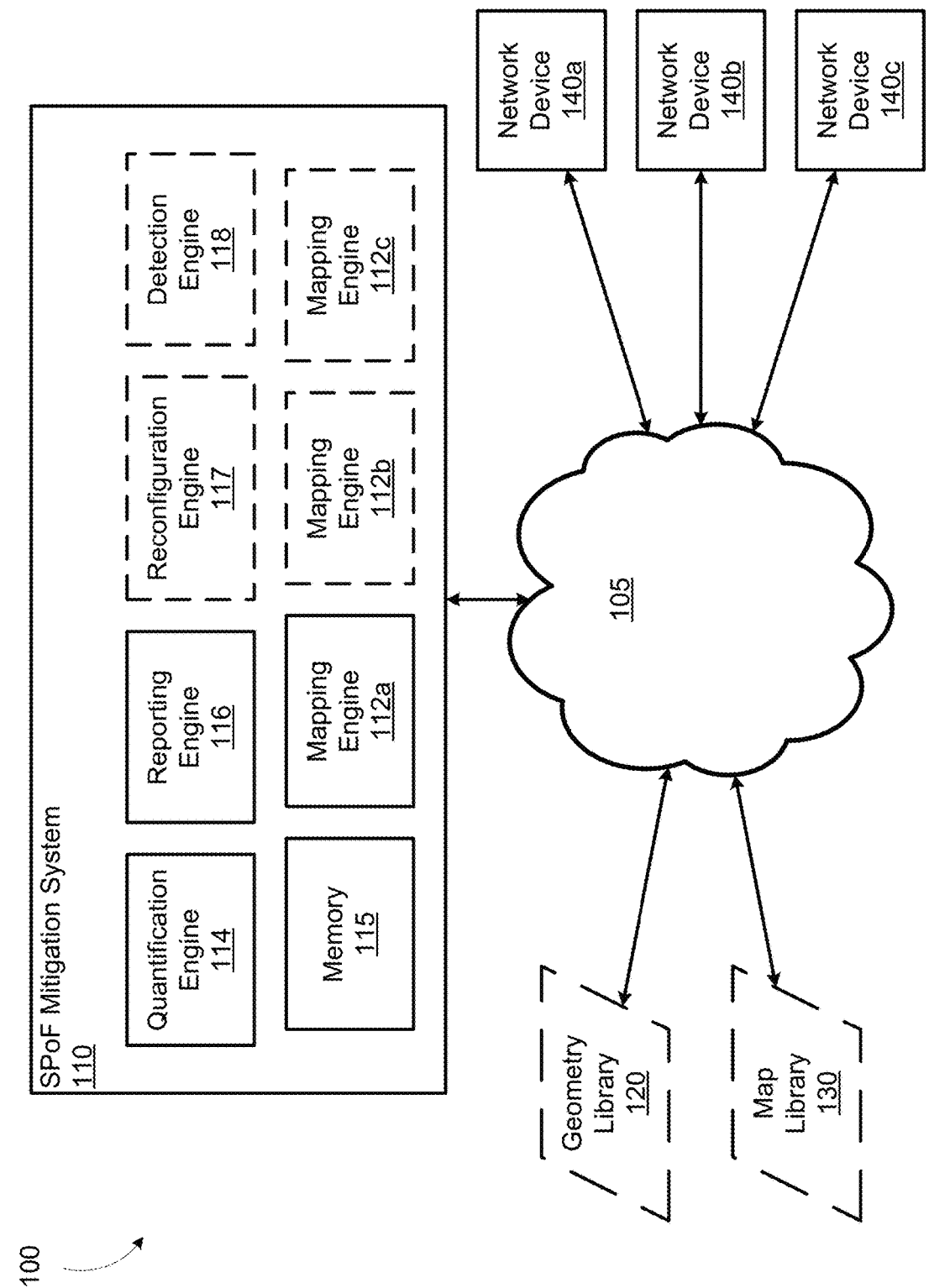
FIG. 1 shows an example system for evaluating single points of failure in a computer network, according to an illustrative implementation.

This disclosure generally relates to quantitative analysis of physical risk due to geospatial proximity of network infrastructure. Computer networks largely rely on physical cabling to transmit signals between computers, be they within buildings or across continents and oceans. Such networks utilize redundancy in the form of two or more network paths between the same endpoints, but across different geographical routes. This allows for a failure in one cable (e.g., physical damage resulting in cutting of fibers) without entirely compromising connectivity between the endpoints.

Single points of failure (SPoFs) are regions in which two or more otherwise redundant cable paths may be affected by the same outage event. For example, if two cables are within close proximity to each other and construction work damages one, then it is likely that it will damage the other one too, resulting in complete compromise of the connectivity despite the intended redundancy.

A brute-force approach to checking cable pairs for SPoFs is to check every possible pairing of cables. For a number of cables n, where n is a non-zero positive integer, it is possible to select $n(n-1)/2$ distinct, unordered pairs which would result in a process having a computational complexity represented in Big-O notation as $O(n^2)$. Big-O notation describes the computational complexity of a process as $O(f(n))$, where $f(n)$ is some function of n, and n is some value specific to the size of the problem. For this problem, n can be the number of cables to be checked for SPoFs, and n^2 can denote n squared. Big-O notation describes either the relative amount of computation time or memory resources required to solve a problem with a particular process. It is standard practice to ignore constant factors in Big-O notation such that, for example O(3n) is simply written as O(n) and only so-called dominating terms remain; for example, O(n^2+n) becomes O(n^2).

This disclosure describes a process that can check cables using O(n) time in the worst-case scenario. This is a significant reduction in computation complexity over the O(n^2) brute-force approach. Theoretically it is not possible to perform such checks in less than O(n) time as all cables must be investigated at least once; therefore the process disclosed herein can achieve best-possible performance.

In the process disclosed herein, each cable—sometimes referred to as a network span—can be approximated by a polyline having a series of latitude/longitude vertices on the Earth, joined by geodesics (shortest lines around a sphere). Any segment of the span that is not adequately approximated by a geodesic can have any number of additional vertices added along the segment until the approximation is adequate.

Next, the process can map all points on the Earth to cells on the surfaces of a cube. Consider placing a cube around the Earth and, from every point on the planet, projecting a line directly upward—i.e., in a direction radially outward from the center of the earth—until it touches the cube. Every set of latitude/longitude coordinates now has a distinct corresponding point on the cube in a one-to-one mapping. The faces (referred to herein as level 0) are then broken down into four equal squares (level 1), each square into four more (level 2), and so on to any arbitrary level depth. Each of the squares, regardless of level, is called a cell. As every coordinate on Earth has a mirrored point on the cube, for any given level, a coordinate will lie within exactly one cell.

For a given span it is now possible to define a set of cells that cover all vertices and geodesics that define the span. Note that these cells do not have to all be at the same level. Finding this covering set of cells is done once for each cable and thus, overall constitutes an O(n) contribution to the process. Mapping respective spans in this manner can be performed in parallel.

Detecting proximity of cables can be performed by a process analogous to coloring in the cells that cover each cable, one cable at a time, and checking if there is already a color in the cell. First, each set of cells are mapped to a series of one-dimensional intervals. One possible manner of mapping cells to intervals can include using a Hilbert curve. A Hilbert curve is a type of space-filling curve that maps a one-dimensional line to a fractal that fills an entire square. Using the inverse mapping it is thus possible to map any cell to an interval in the range [0,1] where an entire face of a cube has the interval [0,1], level 1 cells have intervals [0,0.25], [0.25,0.5],[0.5,0.75], and [0.75,1], and so forth for any arbitrary level. The nature of the Hilbert curve is such that any cell that is a descendant of a cell at a lower level will have an interval that is strictly inside that of its ancestor. A Hilbert curve can be applied to each of the six faces of the cube. The start and end positions of the six faces of the cube are aligned such that their individual Hilbert curves are continuous so we can traverse the entire Earth and map it to a value between 0 and 6; i.e., [0,1] for the first face, [1,2] for the second face, etc. Linearization of 2D cells to 1D intervals using Hilbert curves is described further below with reference to FIG. 7. Other space-filling curves with the same properties may be used.

For each span, its set of covering cells is converted into a set of intervals on the six Hilbert curves; i.e., between 0 and 6. Determining the intervals requires O(n) time and can be performed in parallel. The opening and closing points of all intervals can then be sorted. Although this is generally performed in O(n log n) time, as all processing is already performed in parallel, sorting can be performed when collecting and combining intervals with, for example, a parallel merge sort. In this manner, it is possible to achieve sub-O(n) time, with the dominating O(n) term remaining.

Detecting SPoFs is now a matter of determining all overlapping intervals in the already-sorted list. This can be done in O(m) time, where m is the number of 1D intervals, by iterating over all opening and closing points and noting which other intervals are open when a new one is opened, thus indicating a potential SPoF between their respective cables. This also requires O(m) memory.

By placing a lower limit on the size of cells that are used to approximate individual spans, it is possible to detect arbitrary proximity between said spans and any others. This can be achieved by creating a buffer zone around a cell—for example, by adding all neighboring cells that are not already included—that not only covers the span but also all regions that fall within the lowest proximity tolerance.

Once one or more potential SPoFs have been determined, the system can issue a report of regions that include potential SPoFs.

In some implementations, the system can send instructions to network equipment to, for example, alter switching and routing behaviors to mitigate the SPoF.

The process generally includes the following steps:

1. Mapping each polyline to a set of cells, where each polyline approximates a network span and each cell represents a distinct geographic region.

2. For each point in a set of points representing geographic locations, determining a level of risk that an event at the point will affect at least two polylines.

3. For at least one region of points, determining that the region is a potential SPoF if the combined level of risk across all points in the region exceeds a threshold value.

4. Generating a report of regions that include potential SPoFs.

5. Reconfiguring a network device of the computer network to mitigate the potential SPoF.

In some implementations, computational resources can be further conserved by limiting the problem to only a set of points predetermined to have a non-zero risk of being a single point of failure. For example, the set of points representing geographic locations can include the following steps:

1. Mapping each set of cells to a series of one-dimensional intervals.

2. Determining a set of overlapping intervals between respective series of one-dimensional intervals, where each overlapping interval corresponds to a cell representing a candidate potential SPoF.

3. Generating the set of points from the set of overlapping intervals.

Recognizing that an event disrupting two network spans can result in a very different failure scenario than an event disrupting three network spans, the system can, in some implementations, determine probabilities that an event at a point will disrupt the two network spans but not the third. This process can be generalized further to an arbitrary number, where for a set of n cells, it can determine probabilities that an event will disrupt 2≤r≤n but not the remaining n−r cells.

In some implementations, the system can additionally or alternatively take into account an additional parameter that includes a region-dependent failure probability. The region-dependent failure probability can be represented by a level of baseline risk predetermined for one or more points of the set of points, or can be represented by a different function for calculating failure risk from span proximity. The level of baseline risk for a point can represent that network infrastructure is more prone to failure, or that outage events are more common or have a different distribution of magnitude, in that geographic region.

Other abilities and benefits of the system will become apparent from the following description.

The following is a mathematical description of the proposed severity analysis used to quantify the risk of SPoFs given a set of network spans (polylines).

1. Terminology

The following definitions will assist the description that follows.

Cell—a quadrilateral region on the surface of the Earth. Cells within the same level have approximately the same area.

Polyline—a representation of a network cable on the surface of the Earth. Polylines consist of a set of ordered vertices and connecting geodesics that define the path of the cable.

Outage Event—a hypothetical event, circular in impact with radius r that, if intersected by any Polyline $L_i$, will result in a network outage affecting the cable represented by $L_i$.

Throughout, the probability of an event's occurrence will be based on a memoryless distribution. This implies that the duration of observation is ignored and the probability is identical to a proportion of the duration.

2. Problem Definition

Given:

A set of Polylines $\{L_i\}$; and

A cumulative distribution function (CDF) for the radius of Outage Events, cdf(x)=P (r<x).

What is the probability that there will be a SPoF, defined as at least one Outage Event such that its circular impact region is intersected by every cable path described by $\{L_i\}$?

Assume that there is a known set of Cells $\{C_j\}$ that are sufficiently close to all Polylines to warrant consideration, and that an Outage Event must be centered on a Cell. For each Cell there is also a means of calculating a threshold radius $t_j$ such that an Outage Event will result in failure of all $\{L_i\}$ if and only if ("iff") $r_j \times = t_j$.

3. Solution

Define.

$F_{ij}$ as the outage event under which $L_i$ fails due to an Outage Event centered on $C_j$;

$F_j$ as the outage event under which all $\{L_i\}$ fail due to an Outage Event of radius $r_j$ centered on $C_j$ (i.e. $F_j$ occurs iff $r_j >= t_j$):

|F| as the random variable counting the number of occurrences of $F_j$ across all j Cells; and S as a SPoF event whereby |F|>0.

The problem is thus to calculate P(S). We first consider all Cells to have equal area.

$$P(\overline{F_j}) = P(r_j < t_j) = cdf(t_j) \quad (1)$$

Equation (1) is by definition of the threshold radius and the CDF; i.e., the minimum-sized Outage Event that will result in all network cables failing, and the probability of an event radius being less than this value.

$F_j$: are independent as they are defined relative to Outage Events centered on separate Cells $C_j$. Even though Outage Events centered on neighboring Cells will likely have overlapping impact regions, this does not negate the assertion of independence of their occurrence. Thus, by the joint probability of independent events:

$$P(|F| = 0) = \prod_j P(\overline{F}_j) \quad (2)$$

And substituting (1) into (2):

$$P(|F| = 0) = \prod_j cdf(t_j) \quad (3)$$

$$\therefore P(S) = P(|F| > 0) = 1 - \prod_j cdf(t_j) \quad (4)$$

4. Accounting for Differences in Cell Area

The product of $P(\overline{F}_j)$ in (2) assumes Cells of equal, unit area for some arbitrarily defined unit. By introducing areas $\alpha_j$ corresponding to Cells $C_j$, this can be generalized with geometric weights $\{\alpha_j\}$. Equation (2) thus becomes:

$$P(|F| = 0) = \prod_j P(\overline{F}_j)^{\alpha_j} \quad (5)$$

Which collapses to (2) when all $\alpha_j=1$.

The use of Cells is a discrete approximation to what is a continuous problem in the real world. It amounts to stating that, for all coordinates within Cell $C_j$, $|t_{lat,lng} - t_j| < \epsilon$ where is some suitably small threshold for error. A Cell with m units of area must contribute the same failure probability as m sub-Cells of single-unit area and same cdf($t_j$), thus (5) holds as $\prod_1^m cdf(t_j) = cdf(t_j)^m$. Decreasing the size of approximating Cells, and hence increasing resolution, has the effect of decreasing $\epsilon$ to within a tolerable upper bound.

5. Calculation of Threshold Radius

The event $F_{ij}$ occurs when an Outage Event has radius $r_j >= d_{ij}$ where $d_{ij}$ is the shortest distance from the center of Cell $C_j$ to any part of Polyline $L_i$. This can be computed with the aid of a geometry library, such as the geometry library 120 of the SPoF evaluation system 110 described further below. The threshold $t_j$ which event $F_j$ occurs (i.e. all cables fail) is thus:

$$t_j = \max_i (d_{ij}) \quad (6)$$

6. Exclusive Cable Failure

Define a partitioning of $\{L_i\}$ into disjoint sets of included $\{L^{inc}\}$ and excluded $\{L^{exc}\}$ cables; i.e.

$$\{L^{inc}\} \cap \{L^{exc}\} = \emptyset \quad (7)$$

$$\{L^{inc}\} \cup \{L^{exc}\} = \{L_i\} \quad (8)$$

We now wish to derive $P(S^E)$ of an exclusive SPoF to be the probability of a SPoF event whereby at least one Outage Event is large enough to result in failure of all of $\{L^{inc}\}$ but none of $\{L^{exc}\}$.

First define threshold radius $r_j^{inc}$ as equivalent to $t_j$ but pertaining only to cables in $\{L^{inc}\}$; i.e., the smallest possible radius of an Outage Event centered on Cell $C_j$ that will result in failure of all cables in $\{L^{inc}\}$ regardless of the failure state of any of those in $\{L^{exc}\}$.

For all previously defined events and random variables $F^*$, define their equivalent $F^{E*}$, for an exclusive SPoF, as the event where $F^*$ is true for all of $\{L^{inc}\}$ but none of $\{L^{exc}\}$. Recalling $d_{ij}$, the Polyline-specific failure distances, the probability of an exclusive SPoF caused by an Outage Event at Cell $C_j$ is defined as:

$$P(F_j^E) = \begin{cases} 0 & \text{if } \min_i(d_{ij}^{exc}) < t_j^{inc} \\ cdf(\min_i(d_{ij}^{exc})) - cdf(t_j^{inc}) & \text{otherwise} \end{cases} \quad (9)$$

The zero probability occurs when there is at least one Polyline in the excluded set $\{L^{exc}\}$ that is closer to the center of $C_j$ than is the furthest member of the included set, implying that it is impossible to have an exclusive SPoF affecting all and only $\{L^{inc}\}$.

The scenario in which an exclusive SPoF is possible corresponds to an annulus describing the impact zone of an exclusive Outage Event. The inner radius of the annulus is $t_j^{inc}$ (i.e. all of $\{L^{inc}\}$ are affected) whilst the outer radius is $\min_i(d_{ij}^{exc})$ (i.e., none of $\{L^{exc}\}$ fail).

When $\{L^{exc}\}=\emptyset$ the problem collapses back to the original non-exclusive SPoF calculation where $P(F_j)=1-cdf(t_j)$ because $\min_i(d_{ij}^{exc})$ is effectively infinite and $cdf(x) \to 1$ as $x \to \infty$.

Following the same logic as for a non-exclusive SPoF:

$$P(\overline{F}_j^E) = 1 - P(F_j^E) \quad (10)$$

$$P(|F^E| = 0) = \prod_j P(\overline{F}_j^E)^{\alpha_j} \quad (11)$$

$$\therefore P(S^E) = 1 - \prod_j ((1 - P(F_j^E))^{\alpha_j}) \quad (12)$$

where (9) should be substituted into (12). The associative and commutative nature of Equation (11) (and it's standard, non-exclusive counterparts (3) and (5)) allow for concurrent calculation of failure-probability contributions across one or more processors and one or more computer servers in a distributed system.

7. Defining the Outage-Event CDF

A goal of this work is to derive a theoretical model of empirical SPoF data—all tuning of this model occurs through the CDF. The use of an Outage Event is a purely hypothetical construct as we do not have data pertaining to event radii but, rather, a proxy in the form of historical outages.

We describe a generalization from a straight-line approximation of SPoF failure risk from one of two parallel spans into a formulation for failure of two or more arbitrarily shaped spans. The straight-line approximation will be referred to as a standard ($P_{std}$) throughout and must define a failure probability proportional to the length of the spans and inversely proportional to the separation distance between them, limiting to zero risk as separation distance tends to infinity. Herein we describe a derivation for a generic exponential function with $0<k<1$ and $\lambda>0$, unit-length cables of separation distance $2s$:

$$S=2s \quad (13)$$

$$P_{std}(S)=ke^{-2\lambda s} \quad (14)$$

Note that use of $2s$ distance instead of $s$ is purely for mathematical convenience.

For cables of length d we invert to survival probability; i.e., $1-P_{std}(S)$, and then raise to the power of d before inverting again: $1-(1-P_{std}(S))^d$. This is equivalent to stating that all unit-length segments survive and thus the entire cable does so too and is, as required probabilistically, asymptotic towards 1 as d tends to infinity. This is captured implicitly by the cell-based approach.

The intention is to define a CDF that results in P(S) approximating $P_{std}(S)$ with equivalence occurring as cells tend towards zero area. The Cell-based approach will then implicitly generalize to arbitrarily shaped cables and SPoFs with $n \geq 2$ cables.

For the purposes of derivation of the CDF, we will assume that Polylines are on a plane with arbitrarily defined x and y axes, and that width and height are dimensions along these axes respectively. Additionally, assume that all four borders of a Cell are parallel to their respective axes. These assumptions do not violate reality as use of ever smaller Cells, approaching zero area, results in equivalence.

Consider two cables, each parallel to the x axis, offset by $\pm s$ (i.e., having separation distance of $2s$ as in $P_{std}(S)$), and spanning $x=[0, d]$ for the same aforementioned distance $d>0$. We now attempt to calculate the contribution of a column of Cells, of unit width and equal heights h, spanning an infinite range along the positive y axis. By symmetry, we will simply square the contribution to account for $y<0$, and raise it to the power of d to account for all columns along the cable lengths.

For Cell j, vertically centered at $y_j>0$, the threshold Outage-Event radius for failure of both cables $t_j=y_j+s$, as the Outage Event must first reach the x axis (guaranteed to intersect the cable above the x axis) and then the additional separation s to result in failure of the cable below the axis.

Having unit width, Cells have area equal to their heights. Thus, introducing $|F^+|$ as being equivalent to $|F|$ except for a unit-width column of Outage Events above the y axis, and for Cells vertically centered on $h \times (n+0.5)$ for non-negative integers $n \in \mathbb{N}^0$:

$$P(|F^+| = 0) = \prod_{t=s+\frac{h}{2}, s+\frac{3h}{2}...}^{\infty} cdf(t)^h \quad (15)$$

$$= \sqrt{1 - P_{std}(S)} \quad (16)$$

$$= \sqrt{1 - ke^{-2\lambda s}} \quad (17)$$

Figure 5:
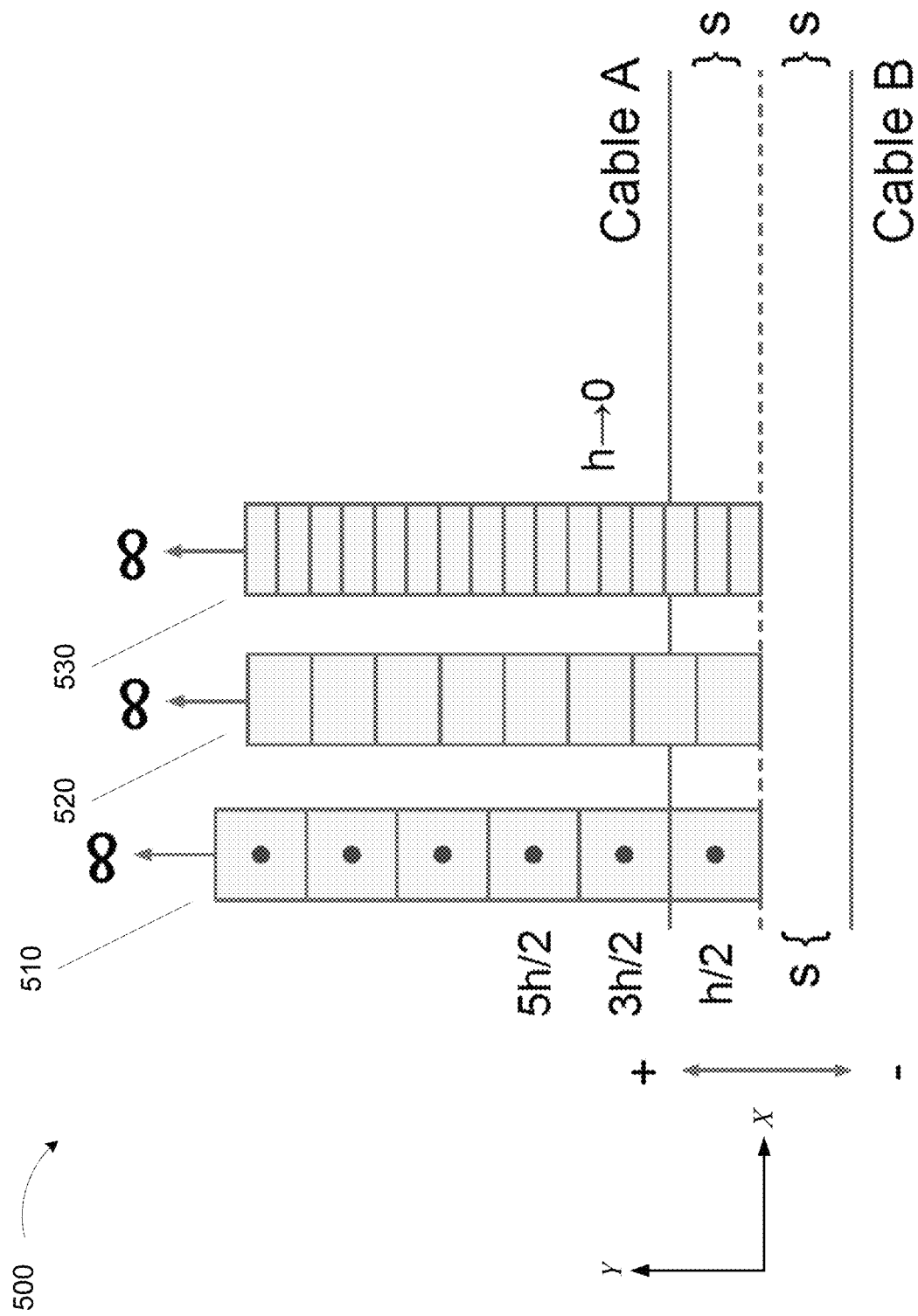
FIG. 5 is a conceptual drawing showing the calculation of the cumulative distribution function, according to an illustrative implementation.

As the Cell-bases calculation is merely a discrete approximation to a continuous-valued problem, we consider shrinkage of the height of Cells. An illustration of this operation is shown in FIG. 5, described further below.

$$P(|F^+| = 0) = \lim_{h \to 0} \prod_{t=s+\frac{h}{2}, s+\frac{3h}{2}...}^{\infty} cdf(t)^h \quad (18)$$

We thus see that the CDF is the geometric derivative (Grossman and Katz, 1972) of the straight-line approximation standard, and introduce the $\tilde{\int}$ (tilde integral) notation of Grossman and Katz to denote the geometric integral:

$$P(|F^+|=0) = \int_s^{-\infty} cdf(t)dt \quad (19)$$

For an arbitrary function $f(x)$ where $f'(x)$ is the standard derivative and $f^*(x)$ is the geometric derivative. Grossman and Katz state that the existence of $f'(x)$ implies the existence of $f^*(x)$ and vice versa, and we note the following identities:

$$\int_a^{-b} f^*(x)dx = \frac{f(b)}{f(a)} \quad (20)$$

and $$f^*(x) = \exp\left(\frac{f'(x)}{f(x)}\right) \quad (21)$$

It thus remains to find some $f(x)$ to simultaneously satisfy Equations (16), (19) and (20), and substitute into Equation (21) in order to define the CDF. (Note that for any function $f(s)$ that asymptotes to 0 as s tends to infinity, this form of $$\frac{1}{\sqrt{1-f(s)}}$$

will generally allow for a solution to the CDF conditions.)

$$\text{for } f(x) = \frac{1}{\sqrt{1-ke^{-2\lambda s}}} \quad (22)$$

$$\lim_{x \to \infty} f(x) = \frac{1}{\sqrt{1-0}} = 1 \quad (23)$$

$$\therefore \int_s^{-\infty} f^*(x)dx = \lim_{b \to \infty} \frac{f(b)}{f(s)} \quad (24)$$

$$= \sqrt{1-ke^{-2\lambda s}} \quad (25)$$

$$= \sqrt{1-P_{std}(S)} \text{ as required} \quad (26)$$

Thus, for Outage Event of radius r:

$$f'(r) = -\frac{ke^{-2\lambda r}\lambda}{(1-ke^{-2\lambda r})^{\frac{3}{2}}} \quad (27)$$

$$\frac{f'(r)}{f(r)} = -\frac{ke^{-2\lambda r}\lambda}{1-ke^{-2\lambda r}} \quad (28)$$

$$cdf(r) = f^*(x) = \exp\left(\frac{f'(r)}{f(r)}\right) \quad (29)$$

$$\therefore cdf(r) = \exp\left(-\frac{k\lambda}{e^{2\lambda r}-k}\right) \quad (30)$$

Which, as required for a CDF, is positive, monotonically increasing with respect to r, and asymptotes to 1 as $r \to \infty$.

There will be two semi-circles centered at (0, 0) and (0, d) that constitute the penumbra of the Cell-based method for calculating SPoF probability. As the lengths of cables (on the order of kilometers) are much greater than the typical separation distance of a SPoF (on the order of meters) the contributions of the caps are considered to be negligible such that they can be safely ignored.

The correctness of this approach is demonstrated two-fold in computational tests. The approximation of a geometric integral (via a loop with ever-decreasing heights) proves the lack of errors in the algebra whilst risk analysis of dummy cables of known length, and separation proves general applicability to the problem at hand.

8. Sufficiently Close Cells

Cells beyond $C_j$ will of course contribute to P(S) but, for example, Polylines $\{L_{California}\}$ result in P($F_{Australia}) \approx 1$—which is reflected in the CDF—and can reasonably be excluded. The detection engine 118 specifically detects Cells for which $t_j < t_{max}$ where $t_{max}$ is tunable. For any given CDF and/or coefficients, there will be an upper bound at which the double-precision float representation of cdf(t) ≡1 and thus defines a computational upper bound for $t_{max}$—in the above case this is approximately 60 m.

FIG. 1 shows an example system 110 for evaluating single points of failure (SPoF) in a computer network, according to an illustrative implementation. The SPoF evaluation system 110 can operate in the example environment 100. The environment 100 includes the SPoF evaluation system 110, a network 105, and network devices 140a, 140b, and 140c (collectively "network devices 140"). The environment can optionally include a geometry library 120 and/or a map library 130.

The network 105 can represent a secure, local-area network (LAN) such as a data center network, or an unsecure, wide-area network (WAN) such as the Internet, or a combination of both. The SPoF evaluation system 110 can communicate with the network devices 140 via the network 105. Additionally, the network devices 140 can make up the physical infrastructure of the network 105. Electrical or optical cabling can interconnect the network devices 140. A cable link between two network devices 140 can be referred to as a network span. A network span can have an arbitrary length and shape and can be approximated by a polyline, which itself can be mapped to a set of cells as described further herein.

Each network device 140 can be a switch, router, modem, gateway, software-defined-network application, or other component of computer network infrastructure. In some implementations, each network device 140 can be a network device 1524 such as the network device 1524 discussed below with reference to FIG. 9. Each network device 140 can receive and forward data packets and other network traffic to and from other network devices 140, hosts, servers, and/or client devices, including, for example, the SPoF evaluation system 110. In some implementations, the network devices 140 can operate in one or more software-defined networks (SDNs). In some implementations, the network devices 140 can receive and forward data packets and other network traffic in a data plane. In some implementations, the network devices 140 can send and receive messages including control commands and telemetry data from one or more SDN controllers via a control plane.

The SPoF evaluation system 110 can receive as input data representing network spans of a computer network and output a report indicating all regions determined to contain potential SPoFs. The SPoF evaluation system 110 includes a mapping engine 112a, a quantification engine 114, a reporting engine 116, and a memory 115. In some implementations, the SPoF evaluation system 110 can optionally include additional mapping engines 112b and 112c. The mapping engines 112a, 112b, and 112c can be collectively referred to as "mapping engines 112." In some implementations, the SPoF evaluation system 110 can include more or fewer mapping engines 112. The mapping engines 112 can perform mapping operations in parallel, as will be described in more detail below. In some implementations, the SPoF evaluation system 110 can include a reconfiguration engine 117. In some implementations, the SPoF evaluation system 110 can include a detection engine 118. In some implementations, the SPoF evaluation system 110 and/or its components can be implemented in a computing system such as the computing system 1510 described below with reference to FIG. 9.

The memory 115 can include one or more memory devices including one or a combination of volatile and/or nonvolatile memory. The memory 115 can include random access memory (RAM), FLASH memory, magnetic memory such as a hard drive or tape drive, or optical memory such as optical disks. In some implementations, the memory 115 can include the cache 1575 and/or the memory 1570 described below with reference to FIG. 9. In some implementations, the memory 115 can be divided up into a number of memory spaces or regions. The various memory spaces can exist within the same physical memory device, or distributed across multiple physical memory devices. Each memory space can store, for example, computer program instructions for implementing the methods described herein, as well as data received, processed, and produced by such methods.

The mapping engine 112 can receive as input data representing network spans of a network and output data representing sets of cells respectively covering the network spans. The mapping engine 112 can convert each network span into a polyline having a series of latitude/longitude vertices on the Earth, joined by geodesics. The mapping engine 112 can add additional vertices along the segment until the polyline approximation of the network span is adequately represented relative to the precision required for detecting potential SPoFs. The mapping engine 112 can map all points on the Earth to cells on the surfaces of a cube surrounding the Earth. Consider placing a cube around the Earth and, from every point on the planet, projecting a line directly upward until it touches the cube. Every set of latitude/longitude coordinates now has a distinct corresponding point on the cube in a one-to-one mapping. The faces (referred to herein as level 0) are then broken down into four equal squares (level 1), each square into four more (level 2), and so on to any arbitrary level depth. Each of the squares, regardless of level, is called a cell. As every coordinate on Earth has a mirrored point on the cube, for any given level, a coordinate will lie within exactly one cell. The mapping engine 112 can then map each polyline to a set of cells, where the set of cells covers all vertices and geodesics that define the polyline corresponding to the network span. The cells can be at different levels. For example, one cell covering a region of the span can be a level 1 cell, while another cell covering another region of the span can be a level 2 cell. Finding this covering set of cells is done once for each cable and thus, overall constitutes an O(n) contribution to the process. In some implementations, the SPoF evaluation system 110 can include more than one mapping engine 112, such as mapping engine 112a, mapping engine 112b, and mapping engine 112c. The mapping engines 112 can map respective network spans to sets of cells in parallel. For example, the first mapping engine 112a can map a first polyline to a first set of cells while the second mapping engine 112b maps a second polyline to a second set of cells during an overlapping time period.

In some implementations, the mapping engine 112 can operate in conjunction with a geometry library 120. In some implementations, the geometry library 120 can be internal to the SPoF evaluation system 110. In some implementations, the geometry library 120 can be a third-party service such as a cloud computing service that resides on one or more computer servers external to the SPoF evaluation system 110. The geometry library 120 can aid in mapping points on the Earth, a sphere, to points on one or more planes, for example, the cube previously described. Such mapping can be referred to as projection. The cells to which the polylines are mapped can be subdivisions of these planes. An example of a publicly available geometry library 120 is the S2Geometry library, available at http://s2geometry.io/.

In some implementations, the SPoF evaluation system 110 can operate in conjunction with a map library 130. In some implementations, the map library 130 can be internal to the SPoF evaluation system 110. In some implementations, the map library 130 can be a third-party service such as a cloud computing service that resides on one or more computer servers external to the SPoF evaluation system 110. The map library 130 can provide data regarding geography, infrastructure, developments, etc. to the SPoF evaluation system 110. The SPoF evaluation system 110 can use the geography data as a map layer onto which the network spans/polylines can be laid. The geography data can thus present a context for SPoFs and their vicinity; for example, land or water, developed or undeveloped, etc. An example of a publicly available map library 130 is the Google Maps Platform, available at http://cloud.google.com/maps-platform/.

The quantification engine 114 can quantify a level of risk that an event at a given point will affect at least two network spans. For example, two network spans can be mapped to respective polylines approximating the network spans by the mapping engine 112. The quantification engine 114 can then, for each point of a set of points representing geographic locations, determine whether an event of a certain magnitude will affect at least two network spans. In some implementations, the magnitude of the event can be modeled as a radius from the point. The quantification engine 114 can therefore determine whether a circle of the given radius from the point will reach polylines corresponding to two or more network spans. If so, that point can be considered a potential SPoF. In some implementations, the quantification engine 114 can, for each point in the set of points, determine the event magnitude (i.e., radius) required to reach all network spans in a set of two or more network spans. The required magnitude will be inversely proportional to the level of risk that an event at that point will affect the network spans in a set of two or more network spans. The level of risk across all points can be combined, the quantification engine 114 can determine that a region contains a potential SPoF. The quantification engine 114 can then inform the reporting engine 116 of the potential SPoFs.

Figure 4:
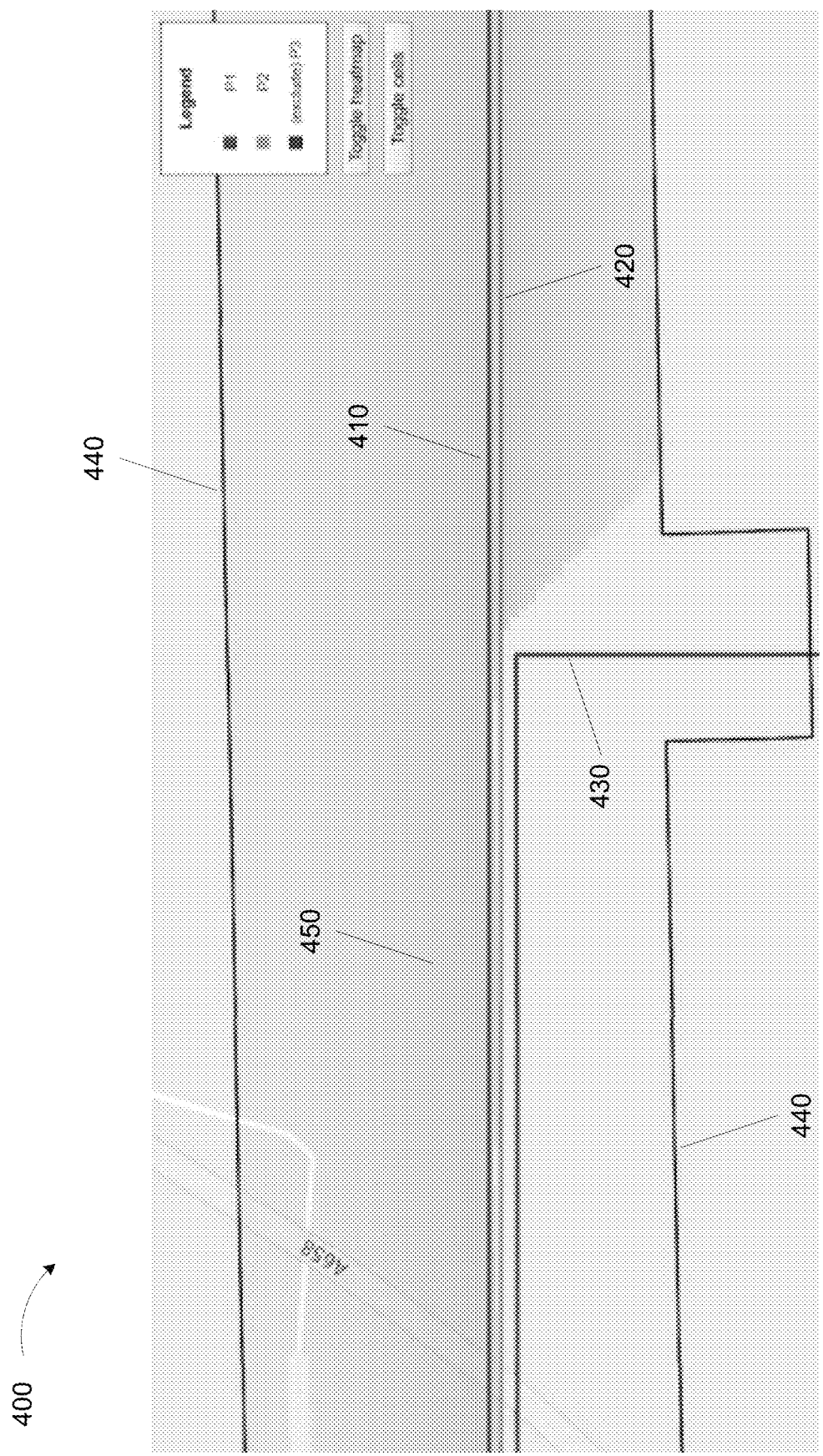
FIG. 4 shows a map including three network spans and a region of potential single points of failure corresponding to a disruption of the first and second network spans, but not the third, according to an illustrative implementation.

In some implementations, the quantification engine 114 can determine potential SPoF scenarios where some, but not all, network spans in a geographic region are affected. For example, for a geographic location, an event of a first magnitude may affect a first network span and a second network span, but not a third network span. A multiple, but not complete, network span disruption represents a very different failure scenario than one in which all network spans between two endpoints are disrupted. An analysis of a multiple, but not complete, network span disruption scenario is illustrated by FIG. 4. FIG. 4 shows a map 400 of a geographic region in which three network spans 410, 420, and 430 run in proximity with each other for a distance before the network span 430 breaks off. In FIG. 4, the region of interest has been restricted to a subset of the entire geographic area as indicated by the box 440. In some implementation, this restriction of the set of points for quantification can be input into the SPoF evaluation system 110 manually. In some implementations, the points for quantification can be predetermined by the detection engine 118 according to a process described further below. In implementations where the quantification engine 114 determines potential SPoF scenarios where some, but not all, network spans in a geographic region are affected, the mapping engine 112 can map first, second, and third polylines to first, second, and third sets of cells, respectively. The quantification engine 114 can then, for each point in a set of points, determine a first threshold value for a level of risk that an event at the point will affect the first network span and the second network span, but not the third network span. The quantification engine 114 can then, for each point in the set of points, determine a second threshold value for a level of risk that an event at the point will affect all three network spans. The quantification engine 114 can determine that the point is a potential SPoF if the first level of risk for the point exceeds the first threshold value but is less than the second threshold value. The risk associated with each point may be reported graphically, as demonstrated by shading 450 in the map 400 of FIG. 4, described further below, with higher risk being represented by greater opacity and zero risk being denoted by transparent regions.

In some implementations, the quantification engine 114 can additionally or alternatively take into account an additional parameter that includes a region-dependent failure probability. The region-dependent failure probability can be represented by a level of baseline risk predetermined for one or more points of the set of points. The level of baseline risk for a point can represent that network infrastructure is more prone to failure, or that outage events are more common, in that geographic region. Accordingly, in some implementations, each point in a set of points includes a level of baseline risk and a region-specific distribution of event radii, where the level of baselines risk and the region-specific distribution represents a geographic region-dependent outage-event probability. Thus, the level of risk for each point includes the level of baseline risk for the point, plus the risk that an event at the point will affect at least a first cell of the first set of cells and a second cell of the second set of cells. Consideration of region-dependent failure can be achieved by substituting a region-specific CDF or region-specific CDF coefficients.

The SPoF mitigation system 110 includes a reporting engine 116. The reporting engine 116 can output a report indicating all regions determined to contain potential SPoFs. The report can include a digital file or transmission including data indicating the points determined to be potential SPoFs. The reporting engine 116 can provide the report to another module of the SPoF mitigation system—for example, the reconfiguration engine 117—or output the report to an external system or client. In some implementations, the report can be used to create a visualization, and alert, or a record of the potential SPoFs. In some implementations, the report can include additional details of the evaluation, such as the level of risk for each point, and the threshold value used for determining that each point is a potential SPoF. In some implementations, the report can include data regarding the network spans affected by each potential SPoF. In some implementations, the report can include a probability that two or more network spans will be affected by a potential SPoF. In some implementations, the report can include a probability that two or more network spans will be affected by a potential SPoF while one or more other network spans are explicitly unaffected. In some implementations, the report can include a probability that a potential SPoF will affect all network spans between two network nodes. In some implementations, the report may include or take the form of a graphical display of SPoF data. Such data may be displayed in tabular format (e.g., sorted by SPoF probability, potential network performance impact of SPoF, or a function of both the probability and potential performance impact of an SPoF at a given location) or on a map that identifies geographic positions of SPoFs. In some implementations, the graphical identification of SPoFs can be color coded, for example, based on SPoF probability, potential impact, or a function of the SPoF probability and potential impact.

In some implementations, the SPoF evaluation process can be performed on demand, with a report output upon request. In some implementations, the evaluation process can run periodically or constantly, and output a report of potential SPoFs as they are determined.

In some implementations, the SPoF evaluation system 110 can include a reconfiguration engine 117. The reconfiguration engine 117 can receive the report indicating potential SPoFs from the reporting engine 116, and output commands or instructions for reconfiguring one or more network devices 140 to mitigate a potential SPoF. SPoF mitigation can be accomplished in several ways including reconfiguring a network device 140 to route traffic to a destination via a different network span, reconfiguring the network device 140 to set a network span as a backup route for handling traffic in the event of a failure of one or more other network spans, and/or reconfiguring the network device 140 to divide data traffic between the network span that traverses the potential SPoF and another network span that does not traverse the potential SPoF. In some implementations, the reconfiguration engine 117 can reconfigure the network device 140 to mitigate a potential SPoF affecting a first network span and a second network span by rerouting data traffic through the network device 140 to a third network span between a first point on the first network span and a second point on the first network span, such that the third network span does not traverse the potential SPoF. That is, the third network span is geographically removed enough from the potential single point of failure that the likelihood of an event disrupting both the first, second, and third network spans would be negligible. In some implementations, the reconfiguration engine 117 can reconfigure the network device 140 to mitigate a potential SPoF affecting the first network span and the second network span by setting a third network span between the first point on the first network span and the second point on the first network span as a backup route in the event of an outage event at the potential SPoF. In this case, in the event data traffic along both the first and second network spans is disrupted, the network device 140 can quickly reroute data traffic to the third network span without having to calculate a new route or await instructions from a controller. In some implementations, the reconfiguration engine 117 can reconfigure the network device 140 to mitigate a potential SPoF affecting the first network span and the second network span by dividing data traffic through the network device 140 between the first network span and a third network span that does not traverse the potential SPoF. Network spans can sometimes include multiple fibers or cables that are logically bundled to act as a single connection between respective network devices 140. In some implementations, the reconfiguration engine 117 can instruct the network device 140 to logically regroup the bundles such that a bundle includes cables from the two different network spans, where one of the network spans does not traverse the potential SPoF. Thus, if an outage event disrupts data traffic in both the first and second network spans, some if not all of the data traffic previously traversing the first network span can automatically reroute to the third network span instead by virtue of the bundling.

Figure 7:
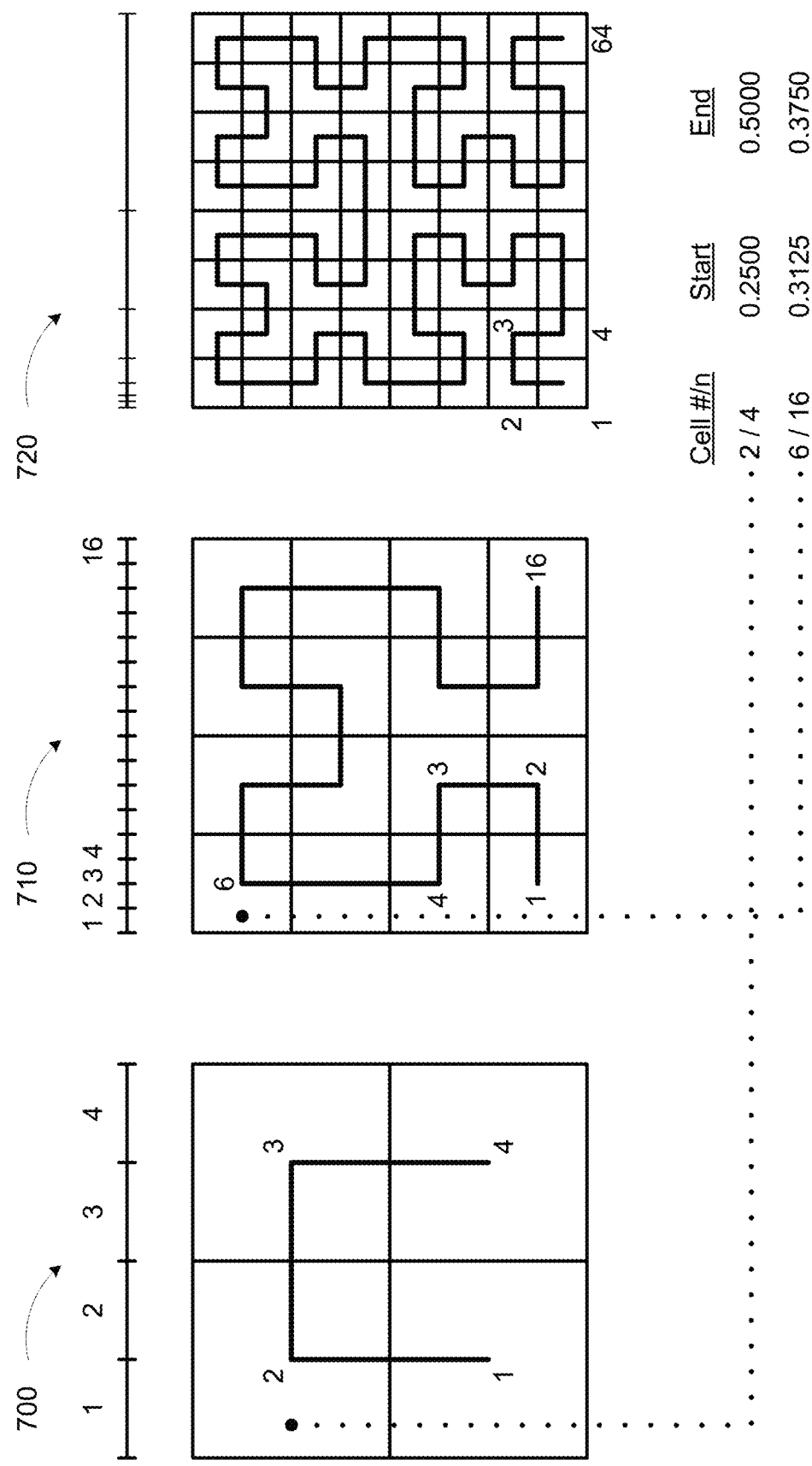
FIG. 7 shows an example mapping of cells in a 2D plane to a 1D series of intervals using a Hilbert curve, according to an illustrative implementation.

In some implementations, the SPoF evaluation system can include a detection engine 118. The detection engine 118 can help conserve computational resources of the quantification engine 114 by limiting the quantification operations to only a set of points predetermined to have a non-zero or non-negligible risk of being a single point of failure. For example, in FIG. 4, the region of interest has been restricted to a subset of the entire geographic area as indicated by the box 440. The detection engine 118 can determine the set of points to be considered by the quantification engine 114 in determining potential SPoFs. The set of points can be a subset of all points in a geographic region of interest, which can include a portion or all of the Earth. The detection engine can map the set of cells corresponding to each polyline, as determined by the mapping engine 112, to respective series of one-dimensional intervals. The detection engine 118 can determine a set of overlapping intervals between respective series of one-dimensional intervals. Each overlapping interval can correspond to a cell representing a location of a candidate potential SPoF. The detection engine 118 can generate the set of points from the set of overlapping intervals. In some implementations, the detection engine 118 can map the sets of cells to the respective sets of one-dimensional intervals using a space-filling curve; for example, a Hilbert curve. An example of mapping cells to one-dimensional intervals using a Hilbert curve is shown in FIG. 7, which is described in further detail below. In some implementations, other space-filling curves or shapes can be applied, or overlapping regions can be determined in two-dimensional space without the need for a curve. In some implementations, the detection engine 118 can determine the overlapping intervals using a sorting method. For example, each individual interval has an open point and a close point. The detection engine 118 can sort all of the individual intervals according to each's open point. The detection engine 118 can then, for each individual interval having an open point and a close point, determine that an open point of a second individual interval falls between the open point and the close point of the individual interval. The operation is analogous to coloring the cells that are traversed by each polyline, and detecting where colored cells coincide or overlap. The overlapping cells can be considered candidate potential SPoFs for defining the set of points considered by the quantification engine 114. In performing the detection operations, polylines representing network spans should be mapped to cells large enough to create a reasonable geographic buffer around the polylines. Mapping the network spans to relatively large cells in this manner will increase the detected amount of overlap in sets of cells representing respective network spans. The result may include "false positives" in the sense that the set of points provided to the quantification engine 114 for consideration will include many points for which the quantification engine 114 will find low enough levels of risk that the quantification engine 114 will not determine them to be potential SPoFs for any realistic threshold value. These false positives, however, will not be expected to detrimentally increase the computational load on the quantification engine 114 in determining potential SPoFs. On the other hand, it may be beneficial to accept a certain proportion of false positives to avoid the occurrence of false negatives because, by the nature of this prescreening of the set of points by the detection engine 118, any points not detected and thus not provided to the quantification engine 114 will not be considered for their potential for being SPoFs.

Figure 2:
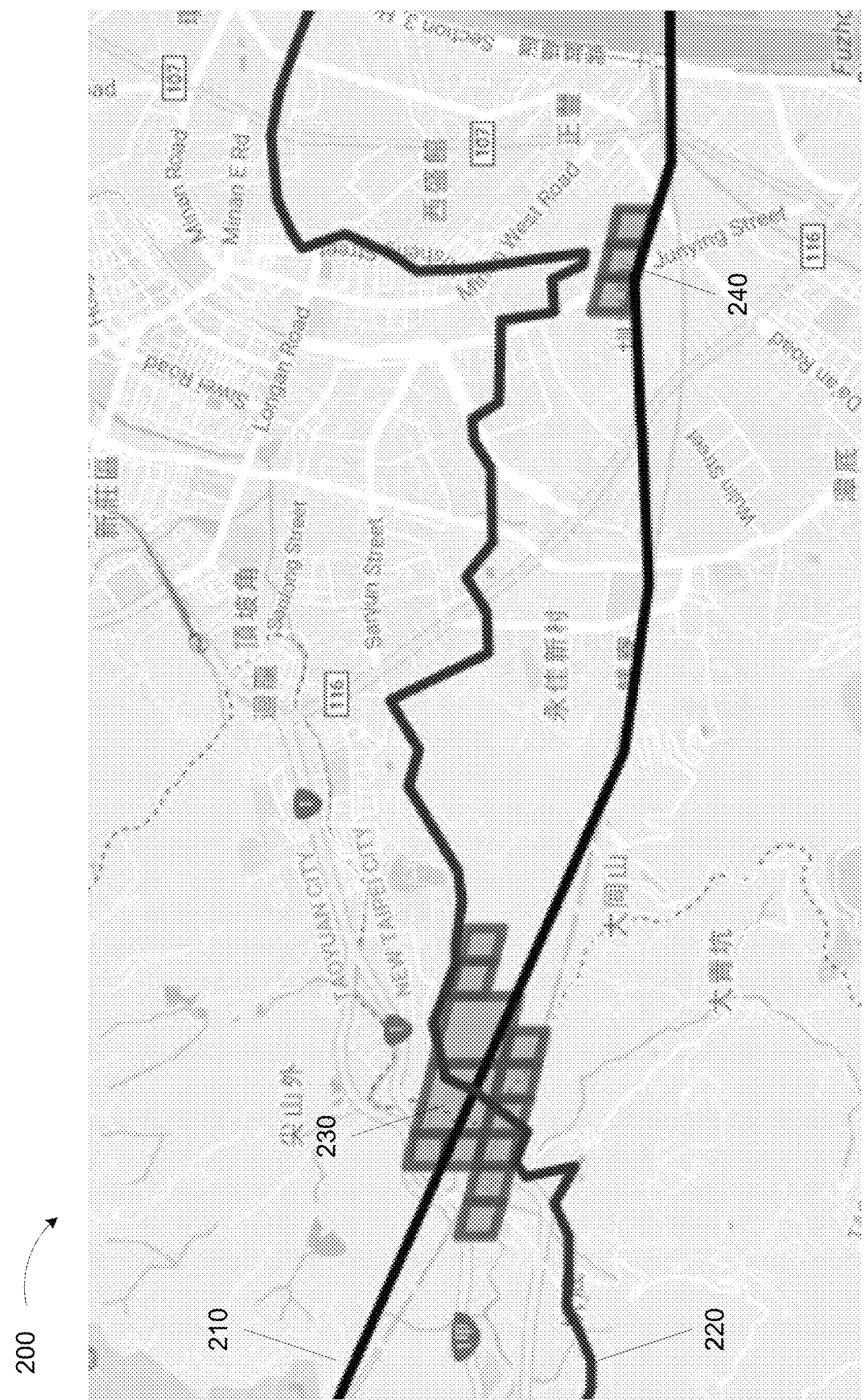
FIG. 2 shows a map including two network spans and regions of potential single points of failure corresponding to a relatively high threshold value for level of risk, according to an illustrative implementation.

FIG. 2 shows a map 200 including two network spans 210 and 220, and two regions of potential single points of failure 230 and 240 corresponding to a relatively high threshold value for level of risk, according to an illustrative implementation. The sets of potential SPoFs 230 and 240 are regions where a level of risk that an event occurring in the middle or centroid of one of the cells indicated will disrupt traffic in both of the network spans 210 and 220 is above a threshold level. Note that the cells indicating potential SPoFs 230 and 240 can have different sizes.

Figure 3:
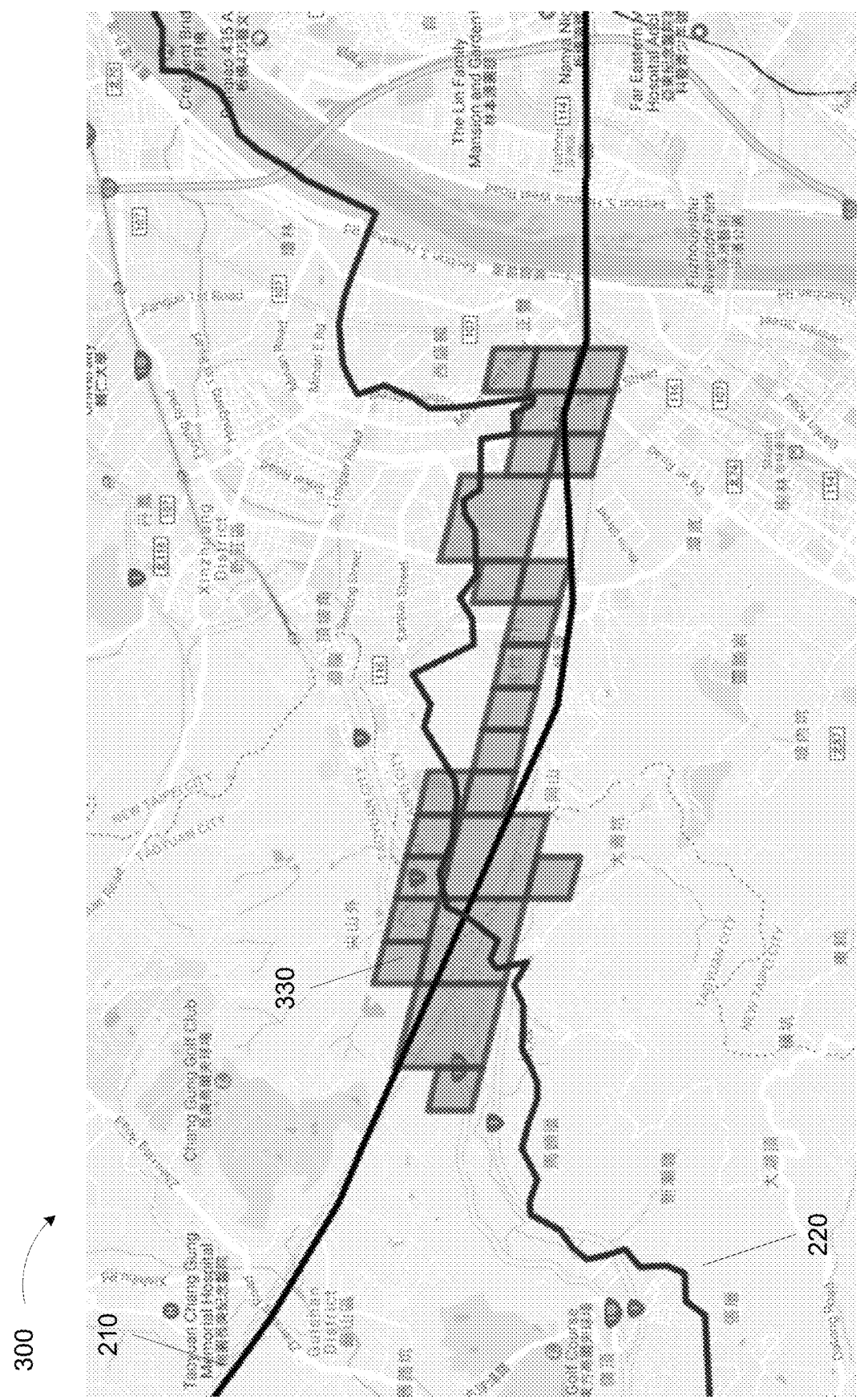
FIG. 3 shows a map including two network spans and a region of potential single points of failure corresponding to a relatively low threshold value for level of risk, according to an illustrative implementation.

FIG. 3 shows a map 300 including the two network spans 210 and 220 and a region of potential single points of failure 330 corresponding to a relatively low threshold value for level of risk, according to an illustrative implementation. The map 300 covers a geographic region similar to map 200 and includes the same two network spans 210 and 220. The map 300, however, reveals a set of potential SPoFs determined for a lower threshold value relative to the map 200. That is, a lower risk that an event will disrupt traffic in both of the network spans 210 and 220 qualifies a region or cell as a potential SPoF 330. Accordingly, the map 300 reveals more potential SPoFs than the map 200. Note again that the cells indicating potential SPoFs 330 can have different sizes.

FIG. 4 shows a map 400 including three network spans 410, 420, and 430, and a region of potential single points of failure (shaded regions) corresponding to a disruption of the first network span 410 and the second network span 420, but not the third network span 430. In the map 400, the three network spans 410, 420, and 430 run in proximity with each other for a distance before the network span 430 breaks off. In the map 400, the potential SPoFs are only determined within a defined geographic region 440. Map 400 therefore illustrates an example where the detection engine 118 has predetermined a set of points for potential SPoF determination by the quantification engine 114. In some implementations, this restriction of the set of points for quantification can be input into the SPoF evaluation system 110 manually. The risk associated with each point may be reported graphically, as demonstrated by shading 450, with higher risk being represented by greater opacity and zero risk (or points not quantified) being denoted by transparent regions. Note that the cells used in the quantification engine 114 can have equal or smaller sizes to those used in the detection engine 118 and that, as cell size reduces, accuracy of the quantification engine 114 increases.

The shading represents a risk that an event of a certain magnitude may affect a first network span and a second network span, but not a third network span; i.e., a darker shade represents a higher risk. A multiple, but not complete, network span disruption represents a different failure scenario than one in which all network spans between two endpoints are disrupted. In a simple example, were the network spans 410 and 420 to be disrupted, it may still be possible to reroute traffic at least partly through the network span 430. A failure scenario disrupting all three network spans 410, 420, and 430, however, may not allow this fallback opportunity.

FIG. 5 is a conceptual drawing showing the calculation of the cumulative distribution function, according to an illustrative implementation. In this example, the polylines, Cable A and Cable B, are on a plane arbitrarily defined with x and y axes, and that width and height are dimensions along the respective axes. Borders of each cell are parallel to their respective axes.

Cable A and Cable B run parallel to the x axes, and are offset from the x axes by ±s giving them a separation distance of 2s as in $P_{std}(S)$, and spanning x=[0, d] for a shared-fate distance d>0. FIG. 5 shows three columns of cells 510, 520, and 530. Each column extends infinitely along the positive y axis. Each cell has a unit width, and thus its area is equal to its height h.

As described previously, for Cell j, vertically centered at $y_j>0$, the threshold Outage-Event radius for failure of both cables $t_j=y_j+s$, as the Outage Event must first reach the x axis and then the additional separation s to result in failure of the cable below the axis. Introducing $|F^+|$ as being equivalent to $|F|$ except for a unit-width column of Outage Events above the y axis, and for Cells vertically centered on h×(n+0.5) for non-negative integers $n \in \mathbb{N}^0$.

Because the Cell-based calculation is merely a discrete approximation to a continuous-valued problem, we can take the limit of the function as the height of Cells shrinks to zero, as shown by the successive columns of cells 510, 520, and 530. The cumulative distribution function is thus the geometric derivative of the straight-line approximation $P_{std}$.

Figure 6:
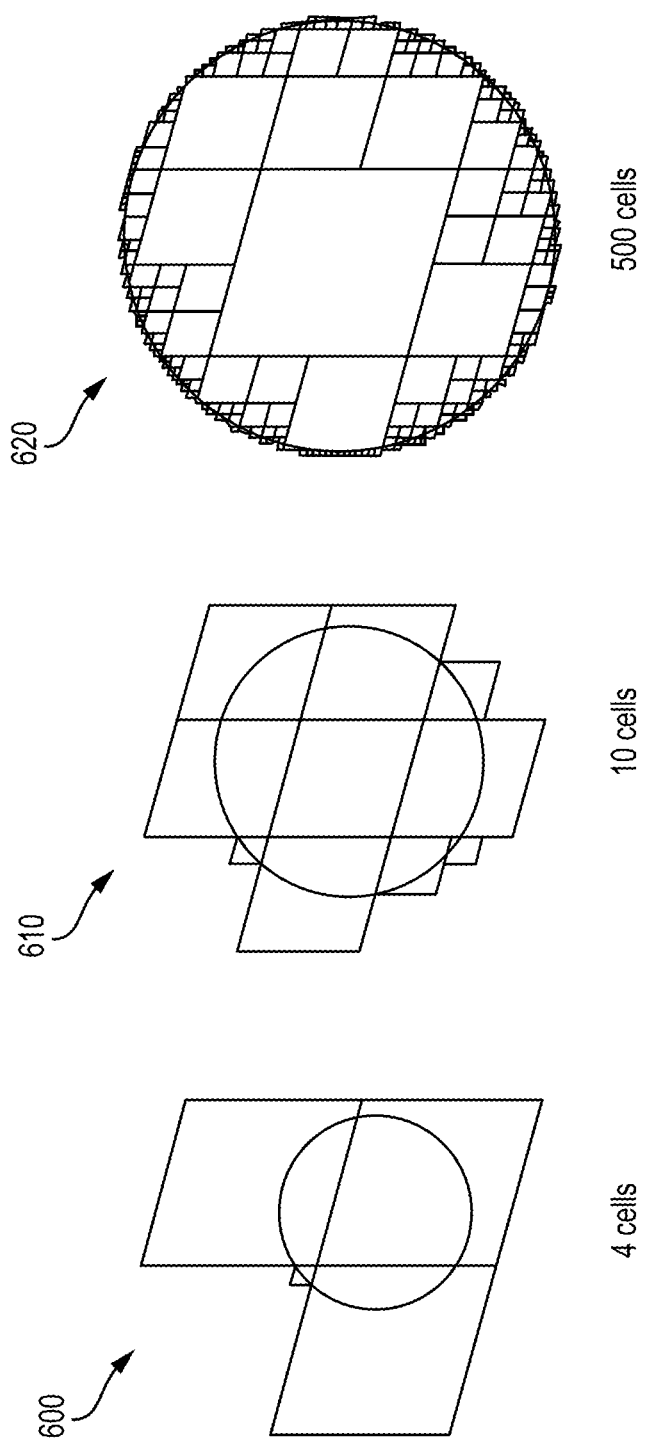
FIG. 6 shows representations 600, 610, and 620 of cell-based coverings for a circular cap on the Earth at increased levels of precision, achieved by projecting it onto a cube and dividing each face in a quadtree fashion to arbitrary depth, according to an illustrative implementation.

FIG. 6 shows representations 600, 610, and 620 of cell-based coverings for a circular cap on the Earth (rather than for network-span polylines) at increased levels of precision, achieved by projecting it onto a cube and dividing each face in a quadtree fashion to arbitrary depth (called levels), according to an illustrative implementation. Cells of different sizes can be used to map arbitrary shapes (including circular caps in FIG. 6 or network spans for the detection engine 118), depending on the accuracy and/or precision of the mapping desired. The representations 600, 610, and 620 progressively utilize more cells to map the same circular cap, resulting in greater precision. In some cases, the sphere can be projected onto six planes of a cube surrounding the sphere. Each side of the cube can represent a level 0 cell. Each side can then be subdivided further; for example, into four squares (level 1), which can each be further divided into four squares (level 2), and so on until the desired level of accuracy or precision is achieved. In the example resulting representation 620, the circular cap has been mapped with relatively small cells in the region of its edge, but relatively large cells in the regions away from its edge. If analysis is performed per cell, mapping shapes and features to cells of varying sizes can reduce the amount of processing required, thereby conserving computational resources.

FIG. 7 shows an example mapping of cells in a 2D plane to a 1D series of intervals using a Hilbert curve, according to an illustrative implementation. Each square 700, 710, and 720 represents a different level of subdivisions: if the main square is considered level 0, the four subdivisions in the square 700 are level 1 cells, the sixteen subdivisions in the square 710 are level 2 cells, and the sixty-four subdivisions in the square 720 are level 3 cells. In each square 700, 710, and 720, a Hilbert curve can propagate through each cell as indicated by the numbers. For example, in the square 700, the Hilbert curve propagates through each cell starting with "1" in the lower left, "2" in the upper left, "3" in the upper right, and "4" in the lower right. In the square 710, the Hilbert curve takes on a more elaborate shape to traverse each cell, and in the square 720 the shape becomes more elaborate still. In each case, the Hilbert curve traverses each cell of the square. Intervals (and/or parts thereof) in the 1D representation will overlap if and only if their corresponding areas (and/or respective parts thereof) overlap in the 2D representation. The Hilbert curve can therefore be used to map a two-dimensional space into a one-dimensional construct. The one-dimensional construct can be broken down into a series of one-dimensional intervals. For example, a Hilbert curve can be mapped to an interval of zero to one. As the Hilbert curve traverses the cells, each cell can have an interval that is an appropriate fraction of the total interval. For example, in the square 700, which has four cells, for a Hilbert curve having an overall interval of zero to one, the interval corresponding to each cell can be as follows: 0-0.25 represents the lower-left cell, 0.25-0.5 represents the upper-left cell, 0.5-0.75 represents the upper-right cell, and 0.75-1.0 represents the lower right cell. In the square 710, the intervals would be 0-0.0625, 0.0625-0.125, 0.125-0.1875, etc. This convention can be used to map only a single cell, or a subset of cells, of a two-dimensional space into a series of one-dimensional intervals. For example, if we are only concerned with the cell labeled "2" in the square 700, the one-dimensional interval representing the area of interest in square 700 would be 0.25-0.50. Similarly, if we are only concerned with the cell labeled "6" in the square 710, the one-dimensional interval representing the area of interest in square 710 would be 0.3125-0.375. In this manner, the cells of interest—for example, cells containing a portion of a polyline representing a network span—can be converted into a series of one-dimensional intervals. If each point on the Earth is projected upwards until it intersects with an imaginary cube surrounding the Earth, each of the six sides of the cube can have an overall interval of 0-1, 1-2, etc. up to 6, with each side divisible into $2^x$ cells for a value of x sufficient to provide the desired spatial resolution. In some implementations, other space-filling shapes can be used; for example, a Peano curve or Moore curve.

Figure 8:
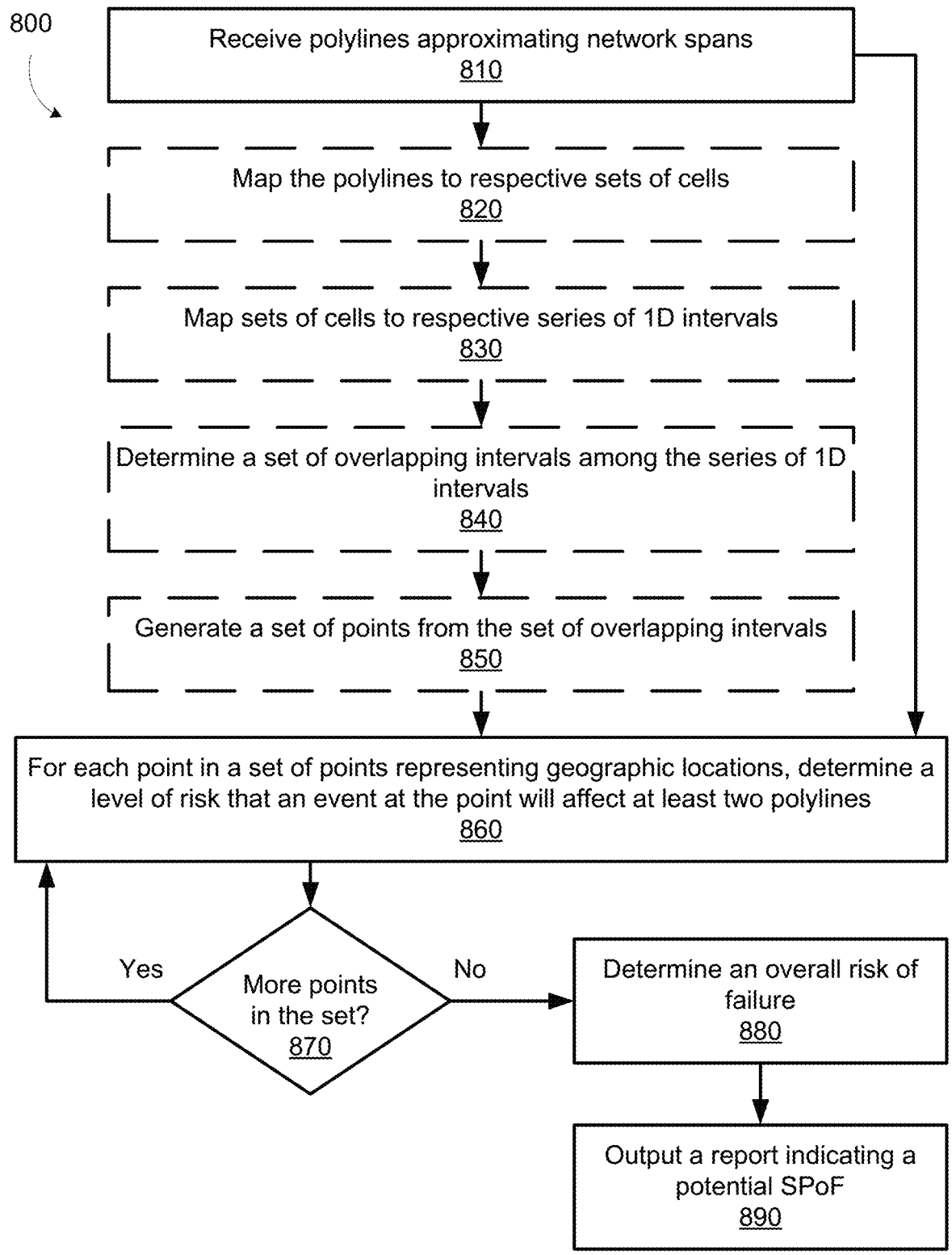
FIG. 8 shows a flowchart of an example method of evaluating single points of failure in a computer network, according to an illustrative implementation.

FIG. 8 shows a flowchart of an example method 800 of evaluating single points of failure in a computer network, according to an illustrative implementation. The method 800 includes receiving polylines approximating network spans (stage 810). The method 800 includes determining a level of risk that an event at a point will affect at least two polylines (stage 860). The method 800 includes determining whether there are more points in a set of points to evaluate (decision block 870). If there are more points to evaluate, the method 800 returns to stage 860. If all points in the set of points have been evaluated, the method 800 proceeds to stage 880. The method 800 includes determining an overall risk of failure (stage 880). The method 800 includes outputting a report indicating at least one point determined to be a potential SPoF (stage 890). The method 800 can be performed by an SPoF mitigation system such as the SPoF mitigation system 110 previously described.

The method 800 includes receiving polylines approximating network spans (stage 810). The SPoF mitigation system can receive data representing the network spans. In some implementations, a mapping engine such as the mapping engine 112 previously described can convert the data representing the network spans into polylines. The polylines can be a series of vertices represented by geographic coordinates and connected by geodesic line segments.

The method 800 includes determining a level of risk that an event at a point will affect least two network spans (stage 860). A quantification engine, such as the quantification engine 114 of the SPoF evaluation system 110 previously described, can quantify the level of risk that an event at a given point will affect at least two network spans. The level of risk is inversely proportional to a radius of a circle centered at the point and having a circumference that intersects all network spans. In some implementations, the quantification engine can determine potential SPoF scenarios where some, but not all, network spans in a geographic region are affected. The quantification engine can determine the level of risk for a set of points of interest. In some implementations, the set of points of interest can be prescreened using a detection process described below with reference to stages 820-850.

The method 800 includes determining whether there are more points in the set of points to evaluate (decision block 870). If there are more points to evaluate, the method 800 returns to stage 860. If all points in the set of points have been evaluated, the method 800 proceeds to stage 880.

The method 800 includes determining an overall risk of failure (stage 880). The quantification can, using the algorithms and formulae previously described, calculate a sum of failure probabilities for all points in the set of points.

The method 800 includes outputting a report indicating at least one point determined to be a potential SPoF (stage 890). The quantification engine can calculate whether a point is a potential SPoF based on the level of risk for the point. The calculation of whether a point is a potential SPoF can be probabilistic; that is, the quantification can quantify the risk of each point, and determine that points having the highest risk are potential SPoFs. In some implementations, the quantification can determine that points having a risk above a certain threshold are potential SPoFs. The quantification engine can pass this data to a reporting engine, such as the reporting engine 116 described previously. The reporting engine can output a report indicating all points determined to be potential SPoFs. The report can include a digital file or transmission including data indicating the points determined to be potential SPoFs. In some implementations, evaluation of potential SPoFs can be performed on demand, with a report output upon request. In some implementations, the evaluation process can run periodically or constantly, and output a report of potential SPoFs as they are determined.

In some implementations, the method 800 can include reconfiguring a network switch to mitigate the potential SPoF. If the quantification engine determines that a point has a level of risk that exceeds the threshold, the reporting engine can provide an indication of that point to a reconfiguration engine, such as the reconfiguration engine 117 of the SPoF evaluation system 110 previously described. The reconfiguration engine 117 can transmit instructions or commands to one or more network devices, such as the network devices 140 of the environment 100, to effect a reconfiguration of the network to mitigate the potential SPoF in one or more of the manners described above with reference to FIG. 1. For example, the reconfiguration engine can accomplish SPoF mitigation in several ways including reconfiguring a network device 140 to route traffic to a destination via a different network span, reconfiguring the network device 140 to set a network span as a backup route for handling traffic in the event of a failure of one or more other network spans, and reconfiguring the network device 140 to divide data traffic between the network span that traverses the potential SPoF and another network span that does not travers the potential SPoF.

In some implementation, the method 800 can include additional steps to determine whether an outage event at a point can disrupt multiple nearby network spans, but fewer than all nearby network spans.

In some implementations, the method 800 can include additional stages to generate a set of points that represent candidate potential SPoFs. In some implementations, the set of points represents a geographic region of interest. These prescreening operations can conserve the computing resources required to determine potential SPoFs by reducing the number of points to be checked. In these implementations, the method 800 can include mapping polylines representing network spans to sets of cells (stage 820), mapping the sets of cells representing the network spans to a series of one-dimensional intervals (stage 830), determining a set of overlapping intervals from among the series of one-dimensional intervals (stage 840), and generating a set of points from the set over overlapping intervals (stage 850). The set of points can be used to constrain the risk quantification operations to a smaller candidate set, thereby conserving computational resources and speeding up the determination and mitigation of potentials SPoFs.

The method 800 includes mapping polylines representing network spans to sets of cells (stage 820). The mapping operations can be performed by one or more mapping engines, such as the mapping engines 112 of the SPoF evaluation system 110 previously described. The mapping engine can receive as input data representing network spans of a computer network, convert the data to polylines (if not already in the form of polylines), and then map the polylines to sets of cells, where each cell represents a geographic region. In some implementations, the SPoF evaluation system 110 can include a plurality of mapping engines 112 for mapping multiple network spans to respective sets of cells in parallel operations; i.e., respective mapping engines 112 can map separate polylines during overlapping time periods.

The method 800 can include mapping the sets of cells representing the network spans to a series of one-dimensional intervals (stage 830). A detection engine, such as the detection engine 118 of the SPoF evaluation system 110 previously described, can map the respective sets of cells corresponding to network spans into respective series of one-dimensional intervals representing the cells traversed by the network spans. In some implementations, mapping the network spans to series of one-dimensional intervals can include mapping each set of cells to a series of intervals on a Hilbert curve.

The method 800 can include determining a set of overlapping intervals from among the series of one-dimensional intervals (stage 840). The detection engine can determine, from the respective series of one-dimensional intervals, a set of overlapping intervals representing cells from two different network spans that overlap or coincide. Each overlapping interval can correspond to a cell representing a region of candidate potential SPoFs. In some implementations, the determination of overlapping intervals can be accomplished by sorting the combined individual intervals of the respective series of one-dimensional intervals according to each individual interval's open point. Then, for a first individual interval having an open point and a close point, the detection engine can determine that an open point of a second individual interval falls between the open point and the close point of the first individual interval (or not, as the case may be), and so on for all individual intervals.

The method 800 can include generating a set of points from the set of overlapping intervals (stage 850). The detection engine can determine, from the set of overlapping intervals, a set of points representing the candidate potential SPoFs. The detection engine can provide the set of points to the quantification engine for determination a level of risk for each point starting at stage 860.

Figure 9:
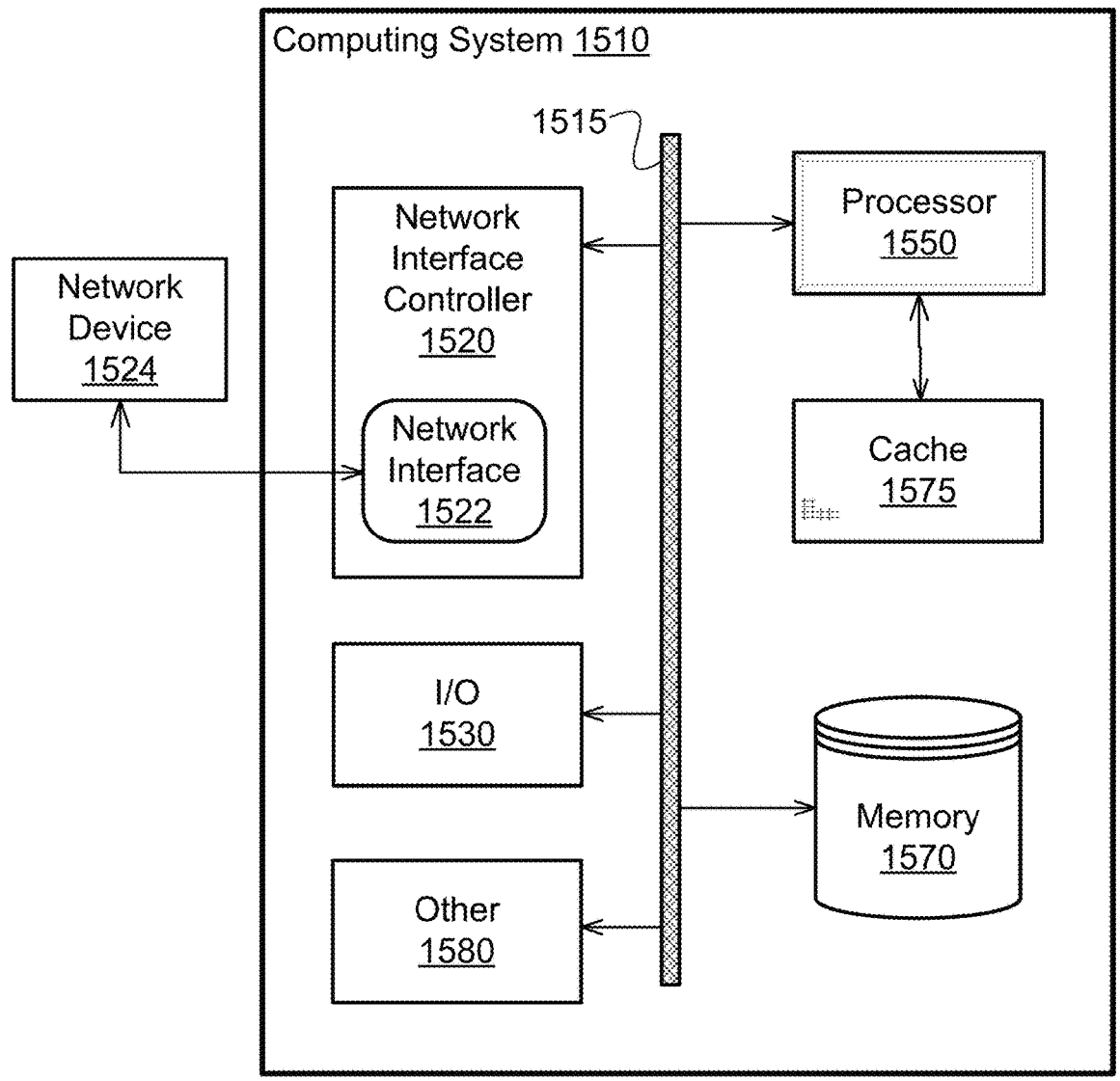
FIG. 9 is a block diagram illustrating a general architecture for a computer system that may be employed to implement elements of the systems and methods described and illustrated herein, according to an illustrative implementation.

FIG. 9 is a block diagram illustrating a general architecture for a computer system 1500 that may be employed to implement elements of the systems and methods described and illustrated herein, according to an illustrative implementation. The computing system 1500 can be used to implement one or more of the devices described above, including the SPoF evaluation system 110, the network devices 130, the geometry library 120, and/or the map library 130. The computing system 1500 can be used to implement one or more of the components of the SPoF evaluation system 110 described above including the mapping engine 112, the quantification engine 114, the reconfiguration engine 117, and/or the optional detection engine 118. The computing system 1500 may be utilized in implementing the evaluating single points of failure in a computer network method 800 shown in FIG. 8.

In broad overview, the computing system 1510 includes at least one processor 1550 for performing actions in accordance with instructions, and one or more memory devices 1570 or 1575 for storing instructions and data. The illustrated example computing system 1510 includes one or more processors 1550 in communication, via a bus 1515, with at least one network interface controller 1520 with one or more network interface ports 1522 connecting to one or more network devices 1524, memory 1570, and any other devices 1580; e.g., an I/O interface. Generally, a processor 1550 will execute instructions received from memory. The processor 1550 illustrated incorporates, or is directly connected to, cache memory 1575.

In more detail, the processor 1550 may be any logic circuitry that processes instructions, e.g., instructions fetched from the memory 1570 or cache 1575. In many embodiments, the processor 1550 is a microprocessor unit or special purpose processor. The computing device 1500 may be based on any processor, or set of processors, capable of operating as described herein. In some implementations, the processor 1550 can be capable of executing the evaluating single points of failure in a computer network method 800 shown in FIG. 8. The processor 1550 may be a single core or multi-core processor. The processor 1550 may be multiple processors. In some implementations, the processor 1550 can be configured to run multi-threaded operations. In some implementations, the processor 1550 may host one or more virtual machines or containers, along with a hypervisor or container manager for managing the operation of the virtual machines or containers. In such implementations, the evaluating single points of failure in a computer network method 800 shown in FIG. 8 can be implemented within the virtualized or containerized environments provided on the processor 1550.

The memory 1570 may be any device suitable for storing computer readable data. The memory 1570 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1500 may have any number of memory devices 1570. In some implementations, the memory 1570 can include instructions corresponding to the evaluating single points of failure in a computer network method 800 shown in FIG. 8. In some implementations, the memory 1570 supports virtualized or containerized memory accessible by virtual machine or container execution environments provided by the computing system 1510.

The cache memory 1575 is generally a form of computer memory placed in close proximity to the processor 1550 for fast read times. In some implementations, the cache memory 1575 is part of, or on the same chip as, the processor 1550. In some implementations, there are multiple levels of cache 1575, e.g., L2 and L3 cache layers.

The network interface controller 1520 manages data exchanges via the network interfaces 1522 (also referred to as network interface ports). The network interface controller 1520 handles the physical and data link layers of the OSI model for network communication. In some implementations, some of the network interface controller's tasks are handled by the processor 1550. In some implementations, the network interface controller 1520 is part of the processor 1550. In some implementations, a computing system 1510 has multiple network interface controllers 1520. The network interfaces 1522 are connection points for physical network links. In some implementations, the network interface controller 1520 supports wireless network connections and an interface port 1522 is a wireless receiver/transmitter. Generally, a computing device 1510 exchanges data with other network devices 1524 via physical or wireless links to a network interfaces 1522. In some implementations, the network interface controller 1520 implements a network protocol such as Ethernet.

The other network devices 1524 are connected to the computing device 1510 via a network interface port 1522. The other network devices can be, for example, the network devices 140 described previously with reference to FIG. 1. The other network devices 1524 may be peer computing devices, network devices, or any other computing device with network functionality. For example, a first network device 1524 may be a network device such as a hub, a bridge, a switch, or a router, connecting the computing device 1510 to a data network such as the Internet.

The other devices 1580 may include an I/O interface, external serial device ports, and any additional co-processors. For example, a computing system 1510 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1500 includes an additional device 1580 such as a coprocessor, e.g., a math co-processor can assist the processor 1550 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of evaluating single points of failure (SPoFs) in a computer network, the method executing on one or more processors and comprising:
   receiving at least a first polyline approximating a first network span and a second polyline approximating a second network span;
   for each point in a set of points representing geographic locations, determining a level of risk that an event at the point will affect at least the first polyline and the second polyline;
   and
     outputting a report indicating at least one point determined to be a potential SPoF based on the level of risk for the at least one point
   wherein the level of risk is a first level of risk, the method further comprising:
     for each point in the set of points, determining a second level of risk that an event at the point will affect the first polyline and the second polyline, but not a third polyline approximating a third network span.

2. The method of claim 1, comprising generating the set of points by:
   mapping at least the first polyline to a first set of cells and the second polyline to a second set of cells;
   mapping at least the first set of cells to a first series of one-dimensional intervals and the second set of cells to a second series of one-dimensional intervals;
   determining a set of overlapping intervals between at least the first series of one-dimensional intervals and the second series of one-dimensional intervals, wherein each overlapping interval corresponds to a cell representing a candidate potential SPoF; and
   generating the set of points from the set of overlapping intervals.

3. The method of claim 2, wherein mapping the first set of cells to a first series of one-dimensional intervals and the second set of cells to a second series of one-dimensional intervals comprises mapping each set of cells to a series of intervals on a Hilbert curve.

4. The method of claim 2, wherein:
   each individual interval of the set of overlapping intervals has an open point and a close point; and
   determining the set of overlapping intervals comprises:
     sorting the combined individual intervals of the first series of one-dimensional intervals and the second series of one-dimensional intervals according to each individual interval's open point; and
     for a first individual interval having an open point and a close point, determining that an open point of a second individual interval falls between the open point and the close point of the first individual interval.

5. The method of claim 1, comprising:
reconfiguring, based on the report, a network device of the computer network to mitigate the at least one potential SPoF.

6. The method of claim 5, wherein reconfiguring the network device includes rerouting data traffic through the network device to a third network span between a first point on the first network span and a second point on the first network span, such that the third network span does not traverse the potential SPoF.

7. The method of claim 5, wherein reconfiguring the network device includes setting a third network span between a first point on the first network span and a second point on the first network span as a backup route in the event of an outage event at the potential SPoF.

8. The method of claim 5, wherein reconfiguring the network device includes dividing data traffic through the network device between the first network span and a third network span that does not travers the potential SPoF.

9. The method of claim 1, wherein:
each point in a set of points includes a level of baseline risk and a region-specific distribution of event radii, the level of baselines risk and the region-specific distribution representing a geographic region-dependent failure-event probability; and
the level of risk for each point includes the level of baseline risk for the point plus the risk that an event at the point will affect at least the first polyline and the second polyline.

10. A system for evaluating single points of failure (SPoFs) in a computer network, the system comprising one or more processors and a memory storing instructions configured to cause the one or more processors to:
receive at least a first polyline approximating a first network span and a second polyline approximating a second network span;
for each point in a set of points representing geographic locations, determine a level of risk that an event at the point will affect at least the first polyline and the second polyline;
and
output a report indicating at least one point determined to be a potential SPoF based on the level of risk for the at least one point,
wherein the level of risk is a first level of risk, and the instructions are configured to cause the one or more processors to:
for each point in the set of points, determine a second level of risk that an event at the point will affect the first polyline and the second polyline, but not a third polyline approximating a third network span.

11. The system of claim 10, wherein the instructions are configured to cause the one or more processors to generate the set of points by causing the one or more processors to:
map at least the first polyline to a first set of cells and the second polyline to a second set of cells;
map at least the first set of cells to a first series of one-dimensional intervals and the second set of cells to a second series of one-dimensional intervals;
determine a set of overlapping intervals between at least the first series of one-dimensional intervals and the second series of one-dimensional intervals, wherein each overlapping interval corresponds to a cell representing a candidate potential SPoF; and
generate the set of points from the set of overlapping intervals.

12. The system of claim 11, wherein the instructions are configured to cause the one or more processors to:
map the first set of cells to a first series of one-dimensional intervals and the second set of cells to a second series of one-dimensional intervals by mapping each set of cells to a series of intervals on a Hilbert curve.

13. The system of claim 11, wherein:
each individual interval of the set of overlapping intervals has an open point and a close point; and
the instructions are configured to cause the one or more processors to determine the set of overlapping intervals by causing the one or more processor to:
sort the combined individual intervals of the first series of one-dimensional intervals and the second series of one-dimensional intervals according to each individual interval's open point; and
for a first individual interval having an open point and a close point, determine that an open point of a second individual interval falls between the open point and the close point of the first individual interval.

14. The system of claim 10, comprising instructions configured to cause the one or more processors to:
reconfigure, based on the report, a network device of the computer network to mitigate the at least one potential SPoF.

15. The system of claim 14, comprising instructions configured to cause the one or more processors to:
reconfigure the network device by rerouting data traffic through the network device to a third network span between a first point on the first network span and a second point on the first network span, such that the third network span does not traverse the potential SPoF.

16. The system of claim 14, comprising instructions configured to cause the one or more processors to:
reconfigure the network device by setting a third network span between a first point on the first network span and a second point on the first network span as a backup route in the event of an outage event at the potential SPoF.

17. The system of claim 14, comprising instructions configured to cause the one or more processors to:
reconfigure the network device by dividing data traffic through the network device between the first network span and a third network span that does not travers the potential SPoF.

18. The system of claim 10, wherein:
each point in a set of points includes a level of baseline risk and a region-specific distribution of event radii, the level of baselines risk and the region-specific distribution representing a geographic region-dependent failure-event probability; and
the level of risk for each point includes the level of baseline risk for the point plus the risk that an event at the point will affect at least the first polyline and the second polyline.

* * * * *